United States Patent Office 3,686,101
Patented Aug. 22, 1972

3,686,101
POLYURETHANE FOAMS OF ORGANIC POLYISO-
CYANATES AND POLYOLS DERIVED FROM AL-
KYLENE DIAMINES AND NOVOLAC RESINS
AND METHOD OF MAKING SAME
Billy D. Davis and Elvis E. Jones, Lake Jackson, Tex.,
assignors to The Dow Chemical Company, Midland,
Mich.
No Drawing. Continuation-in-part of application Ser. No.
707,935, Feb. 26, 1968, which is a continuation-in-part
of application Ser. No. 463,954, June 14, 1965. This
application Feb. 24, 1970, Ser. No. 13,865
Int. Cl. C08g 22/44; C08j 1/18
U.S. Cl. 260—2.5 AQ    12 Claims

ABSTRACT OF THE DISCLOSURE

The invention concerns polyurethane foam prepared from organic polyisocyanates and a mixture of polyether polyols derived from (a) alkylene diamines and alkylene oxides and (b) novolac resins and alkylene oxides, and pertains to a method of making the polyurethane foams.

---

This application is a continuation-in-part of a prior application Ser. No. 707,935 filed Feb. 26, 1968, which in turn is a continuation-in-part of a prior application Ser. No. 463,954 filed June 14, 1965, and now abandoned.

This invention concerns polyurethane foams that are the reaction product of an organic polyisocyanate and a mixture of a novolac polyol and an amine polyol. The invention relates especially to rigid foams and pertains to a method of making the same.

It is known to make polyurethane foams from polyisocyanates by a reaction with a mixture of oxyalkylated polyhydroxy compounds one of which is a polyphenol, e.g. a novolac resin, and the other a saccharose such as sucrose. For example, French Patent No. 1,360,415 makes polyurethane foam from polyether polyols derived from phenol-formaldehyde novolac resins, and from the product of the simultaneous oxyalkylation of sucrose and a polyphenol, i.e. a novolac resin. The foams possess good dimensional stability and are resistant to cracking in places of high humidity or in humidity aging.

It has now been discovered that polyurethane foams possessing improvement in one or more of the properties, density, dimensional stability, K-factor, compression yield strength, moisture vapor transmission, abrasion loss, moldability, and humidity aging can readily be prepared by reacting an organic polyisocyanate with a mixture of a novolac polyol and an amine polyol as more fully hereinafter described.

The novolac polyols to be employed are the adducts or reaction product of an alkylene oxide having from two to four carbon atoms and a novolac resin having an average of from about 2.5 to about 12, preferably from 3 to 6, OH groups in the molecule.

The novolac resin starting materials are prepared by reacting phenol or cresol with from about 0.8 to 1.5 moles of formaldehyde per mole of the phenol or cresol in the presence of an acidic catalyst to form a polynuclear condensation product containing from about 2.5 to 12, preferably 3 to 6 units, which novolac resin is reacted with an alkylene oxide such as ethylene oxide, propylene oxide, butylene oxide, or isobutylene oxide, to form an oxyalkylated product containing a plurality of hydroxyl groups, i.e. a novolac polyol.

The novolac polyols to be employed have the general formula:

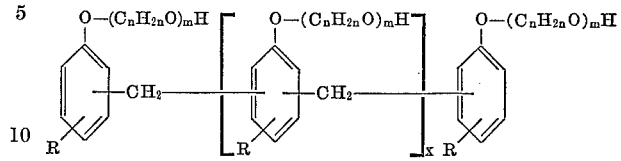

wherein R is a member of the group consisting of hydrogen and the methyl radical, $n$ is a whole number from 2 to 4, $m$ is an integer from 1 to 15, preferably from 1 to 10, and $x$ is an average value from 0.5 to 10, preferably from 1 to 4. Preferably, also the R group is hydrogen (i.e. a phenolic novolac).

The novolac resins and their oxyalkylated products or novolac polyols and methods of making the same are known. For example, U.S. Patent No. 2,838,473 describes a method for making novolac resins from phenol and formaldehyde, and U.S. Patent No. 2,938,884 reacts propylene oxide with novolac resins to make oxypropylated derivatives thereof or novolac polyols. The novolac polyol may be used in amounts correspondingly to from about 40 to 80 percent of the total OH groups in the sum of the polyols used to prepare the polyurethane product.

The amine polyols to be used are the totally oxyalkylated alkylene diamines having the general formula

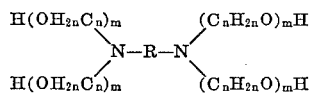

wherein R is an alkylene radical having from 2 to 6, preferably from 2 to 4, carbon atoms, $n$ is a whole number and is independently from 2 to 4 and $m$ is an integer from 1 to 4. A method of making oxyalkylated alkylene diamines is disclosed in U.S. Patent No. 2,697,118. The amine polyol can be employed in amount corresponding to from about 20 to 60, preferably from 20 to about 40 percent of the total OH groups in the sum of the polyols used to prepare the polyurethane products.

The novolac polyols and the amine polyols are employed together to make the polyurethane foams of the invention, but they may be used in admixture with small amounts, e.g. up to 25 percent by weight of the total weight of the novolac and amine polyols, of other polyether polyols such as the reaction products of propylene oxide and/or ethylene oxide with polyhydric alcohols such as glycerine, pentaerythritol, sorbitol, mannitol, or sucrose.

It may be mentioned that in making rigid polyurethane foams according to the invention, best results are usually obtained when using novolac polyols that are the adducts of propylene oxide or principally propylene oxide and in amount corresponding to that wherein $m$ in the general formula is an integer of from 1 to 10. Also, the amine polyol is preferably used in amounts of from 20 to 40 percent of the OH groups in the sum of the polyol starting materials because the amine polyol has an action of catalyzing the urethane reaction with the polyisocyanate and may cause a rapid exothermic reaction which results in scorching of the foam, or foam of poor quality. For this reason, also, small amounts or no catalyst are used when large proportions of the amine polyol are employed.

Any organic polyisocyanate compound including aromatic, aliphatic and cycloaliphatic types may be employed in the present invention. These compounds may contain two or more isocyanate radicals. Mixtures of these polyisocyanate compounds can be employed when desired.

Representative polyisocyanate compounds include toluene-2,4-diisocyanate,
1,6-hexamethylenediisocyanate,
1,4-tetramethylenediisocyanate,
1,10-decamethylenediisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other representative organic polyisocyanates include the polyisocyanates which are described in U.S. 2,683,730; the phenyl indane diisocyanates which are described in U.S. 2,855,385, the organic diisocyanates which are described in U.S. 2,292,443; and the organic triisocyanates which are described in U.S. 2,929,794.

The organic polyisocyanate compounds which may be used also include the isocyanate-terminated reaction products of a molar excess of any of the above described polyisocyanates with the polyhydroxy compounds described.

In making the polyurethane foams of the invention, the proportions of the polyisocyanate compounds and the polyols or other compounds having active hydrogen atoms, may vary widely. One may provide water and excess polyisocyanate to form gases capable of expanding the reaction mass to make a foam. However, the polyurethane foams are preferably prepared employing aliphatic hydrocarbons or halogenated aliphatic hydrocarbons boiling below 110° C. such as dichlorodifluoromethane, trichlorofluoromethane, hexane, hexene or pentane as the blowing or foaming agent. Suitable foaming agents are disclosed in U.S. Pat. No. 3,072,582.

The polyisocyanates are usually employed in an amount slightly in excess of that theoretically required to react with the hydrogen atoms in the sum of the reactants and water in the mixture of materials, preferably in an amount corresponding to from 1.01 to 1.05 NCO group for each OH and active hydrogen atom in the starting materials.

The polyurethane foams may be prepared by a prepolymer procedure, a one-shot process or a batch-wise technique, all of which methods are known to the art. The products are rigid to flexible foams having closed and/or open or interconnected cells.

In practice, a mixture of polyols consisting essentially of a novolac polyol as hereinbefore described and in amount corresponding to from 40 to 80 percent of the reactive OH groups in the sum of the total polyol starting materials and an amine polyol as defined herein in an amount corresponding to from 20 to 60 percent of the OH groups in the sum of the polyol starting materials is reacted with a polyisocyanate in a typical urethane recipe. The recipe may employ a catalyst and oftentimes advantageously uses a plurality of catalysts such as an amine catalyst and a metal salt of an organic acid, and a cell regulating agent, together with an appropriate foaming agent such as $CCl_3F$, $CCl_2F_2$, $C_2Cl_2F_2$, $CHCl_2F$, $CClF_3$ and $CHClF_2$.

Among suitable amine catalysts there are tetramethylenediamine (TMDA), tetramethyl guanidine (TMG), tetramethyl-1,1,3-butanediamine (TMBDA), triethylenediamine ("DABCO") and dimethylethanolamine.

Suitable esters of tin or tin salts are stannous oleate, stannous octoate, and dibutyl tin dilaurate.

The catalysts may be used in amounts corresponding to from about 0.01 to 5 percent based on the total weight of the sum of the weights of the polyols initially used.

Among surface active agents or emulsifiers there may be mentioned, polypropylene glycols having molecular weights between 2000 and 8000, the liquid silicone-glycol copolymers having viscosities of from 350 to 3500 centistokes at 77° F. and polysiloxane polyoxyalkylene block copolymers as described in U.S. Pat. No. 2,834,748.

The following examples illustrate ways in which the principle of the invention has been applied, but are not to be construed as limiting its scope.

EXAMPLE 1

(A) A novolac resin was prepared by adding a charge of 9200 pounds of phenol and 74 pounds of oxalic acid as catalyst, to a reaction vessel equipped with a stirrer and a short distilling column and condenser. The mixture was stirred and was heated to a temperature of about 100° C. A charge of 3600 pounds of aqueous 37 weight percent formaldehyde solution was added with stirring. The mixture was stirred and maintained at about 100° C. for a period of about one hour and 30 minutes. Thereafter, water was removed from the reaction vessel by azeotropic distillation with phenol by heating the reaction mixture at temperatures between about 100° and 140° C., and over a period of about 6 hours. Thereafter, unreacted phenol was separated by distilling it from the product by heating the mixture at temperatures of from about 155° C. up to about 160° C., at an absolute pressure of 0.5 inch of Hg followed by dry steam stripping with 60 p.s.i.g. steam at about 160° C. for about 3 hours followed by stripping at 0.5 in Hg at about 160° C. for about 2 hours to remove the water. The product was a novolac resin having an average molecular weight of 400. The product had the general formula

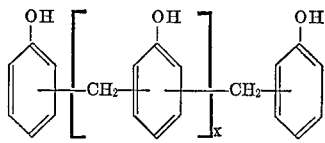

wherein $x$ has an average value of about 1.89.

(B) A novolac polyol was prepared by adding 30 pounds of trimethyl amine catalyst to the novolac resin prepared in part A above. The mixture was stirred and was heated at temperatures between about 144° and about 164° C., while adding propylene oxide thereto at pressures up to 40 pounds per square inch gauge pressure over a period of about 4 hours and 20 min. A total of 3870 pounds of propylene oxide was added. After adding of the propylene oxide and digesting at about 160° C. for about 2 hours, the reaction mixture was stirred and heated under vacuum at a temperature of about 160° C. for a period of about 3 hours, to remove volatiles. The residue or novolac polyol product was a viscous liquid having a viscosity of 378 centipoises at 210° F. and contained 10.6 percent OH by analysis.

(C) An amine polyol was prepared by adding a charge of 5400 parts by weight of aminoethylethanolamine of the formula $H_2NCH_2CH_2NHCH_2CH_2OH$ to a pressure resistant reaction vessel equipped with a stirrer and jacket heating and cooling means. The mixture was stirred and maintained at temperatures between 90° and 112° C. while adding propylene oxide thereto at pressures up to 20 pounds per square inch gauge pressure. The reaction was continued until a total of 9550 parts by weight of propylene oxide were added. Thereafter, volatiles were separated by heating the reaction mixture at 100–110° C. at 5 mm. absolute pressure for a period of about 6 hours. The residue or amine polyol product was a liquid having a viscosity of 38 centistokes at 210° F., an OH equivalent weight of 70.2, and contained 24.2 percent by weight OH by analysis.

(D) In each of a series of experiments, a polyurethane foam was prepared from a mixture of the novolac polyol prepared in part B above and the amine polyol prepared in part C above, and other ingredients employing the ingredients in proportions as stated in Table I. The ingredients were blended with one another in a high speed mixer for about 10 seconds, after which the mixture was poured into an open paper container and was allowed to foam at ambient temperature. The foamed product or bun was cured by heating it at a temperature of 60° C. for a period of 1 hour. Thereafter, test pieces were cut from the bun and were used to determine the properties of the foam which are tabulated in Table II.

For convenience, the proportions of the novolac and amine polyol in Table I have been converted to the percent of total hydroxyl and included in Table II. While the results shown for the runs made according to this invention show a good balance of physical properties, the improved properties obtainable with this invention are most effectively shown in large scale, continuous (commercial) manufacture of foam where the improved property of moldability is more evident. Further, large scale production of foams is less likely to produce erratic results, as is more commonly encountered with laboratory scale preparation of foams, due to small errors in the proportions of reactants, for example.

thane foam by a procedure similar to that employed in part D of Example 1 using the recipe:

| Ingredients: | Parts by weight |
|---|---|
| Novolac polyol | [1] 296.5 |
| Amine polyol | [2] 39.8 |
| Polymethylene polyphenylisocyanate | 263.7 |
| Trichlorofluoromethane | 112 |
| Tris(chloroethyl)phosphate | 90 |
| Liquid silicone-glycol copolymer | 6 |
| Tetramethyl-1,3 butanediamine | 1.8 |

[1] OH 70%.
[2] OH—30%.

The polyurethane foam had the properties:

Density—2.1 lbs./cu. ft.
Abrasion loss—7.9 percent
Humidity aging (28 days)—4 percent

EXAMPLE 3

A novolac polyol having an OH equivalent weight of 171 was prepared by reacting 79.5 parts by weight of 1.2-butylene oxide with 120.5 parts by weight of a novolac resin similar to that prepared in part A of Example 1 and having an average OH functionality of 3.15, employing procedures to make said novolac polyol similar to those employed in parts A and B of Example 1, and an amine polyol similar to that prepared in part C of Example 1 were used to make a polyurethane foam, using the recipe:

| Ingredient: | Parts by weight |
|---|---|
| Novolac polyol | [1] 200 |
| Amine polyol | [2] 20.4 |
| Polymethylene polyphenylisocyanate | 204 |
| Trichlorofluoromethane | 72 |
| Liquid silicone-glycol copolymer | 4.2 |
| Tetramethyl-1,3-butane diamine | 21 |

[1] OH—80%.
[2] OH—20%.

TABLE I

| | Starting materials, parts | | | | | | |
|---|---|---|---|---|---|---|---|
| Run Number | Novolac polyol | Amine polyol | Poly-isocyanate | Cl₃CF trichloro-fluoro-methane (F-11) | Tris-(chloro-ethyl)-phos-phate | Silicone surfac-tant | TMBDA amine catalyst |
| 1 | 321.7 | None | 278.3 | 108 | 45 | 3 | 4.5 |
| 2 | 298.7 | 14.5 | 286.8 | 108 | 45 | 3 | 3.0 |
| 3 | 274.4 | 29.8 | 295.8 | 96 | 45 | 3 | 3.0 |
| 4 | 220.3 | 63.7 | 316.0 | 96 | 45 | 3 | 1.2 |
| 5 | 205.0 | 72.9 | 322.1 | 96 | 45 | 3 | 0.6 |
| 6 | 189.7 | 82.4 | 327.9 | 96 | 45 | 3 | 0.6 |
| 7 | 157.4 | 102.8 | 339.8 | 96 | 45 | 3 | 0.6 |
| 8 | 85.0 | 148.0 | 367.0 | 96 | 45 | 3 | None |
| 9 | 44.3 | 173.2 | 382.5 | 108 | 45 | 3 | None |

TABLE II

| | Starting materials | | | | Foam product | | | | | | Humidity aging, days | | | |
|---|---|---|---|---|---|---|---|---|---|---|---|---|---|---|
| Run No. | Novolac polyol percent OH[1] | Amine polyol percent OH[1] | TMBDA, percent | F-11, per-cent | Den-sity, lbs./cu. ft. | Heat distor-tion, °C. | MVT[2] | Com-pres-sive yield | K factor initial | Abra-sion loss, percent | 1 | 4 | 7 | 14 |
| 1 | 100 | 0 | 0.75 | 18 | 1.84 | 125–130 | 2.09 | 33.8 | 0.105 | 1.5 | 3.3 | 3.3 | 6.7 | 5.0 |
| 2 | 90 | 10 | 0.5 | 18 | 2.05 | 120–125 | 1.39 | 33.2 | 0.106 | 1.7 | 3.3 | 3.3 | 3.3 | 8.3 |
| 3 | 80 | 20 | 0.5 | 16 | 2.05 | 125–130 | 1.45 | 42.0 | 0.112 | 2.0 | 1.6 | 1.6 | 3.1 | 3.1 |
| 4 | 60 | 40 | 0.2 | 16 | 2.04 | 125–130 | 1.26 | 42.9 | 0.110 | 2.0 | 1.5 | 1.5 | 4.6 | 4.6 |
| 5 | 55 | 45 | 0.1 | 16 | 1.92 | 125–130 | 1.75 | 36.4 | 0.114 | 3.4 | 4.6 | 6.2 | 4.6 | 6.2 |
| 6 | 50 | 50 | 0.1 | 16 | 2.04 | 125–130 | 1.21 | 45.8 | 0.108 | 2.4 | 3.1 | 1.5 | 3.1 | 4.6 |
| 7 | 40 | 60 | 0.1 | 16 | 1.96 | 125–130 | 1.32 | 47.8 | 0.112 | 2.5 | 1.6 | 1.6 | 3.1 | 1.6 |
| 8 | 20 | 80 | None | 18 | 1.76 | 140–145 | 1.14 | 44.3 | 0.108 | 6.5 | 6.7 | 3.3 | 3.3 | 6.7 |
| 9 | 10 | 90 | None | 18 | 1.83 | 130–135 | 1.55 | 42.3 | 0.108 | 9.0 | 6.6 | 6.6 | 6.6 | 8.3 |

[1] Percent OH = percent of total polyol OH; [2] MVT = Moisture vapor transmission.

EXAMPLE 2

A novolac polyol having a viscosity of 99.5 centistokes at 210° F., an OH equivalent weight of 225 and containing 7.53 percent by weight of OH, prepared by reacting propylene oxide with a novolac resin having an OH functionality of 3.5 similar to that prepared in part A of Example 1, and an amine polyol similar to that prepared in part C of Example 1, were used to prepare a polyure- The polyurethane foam had the properties:

Density—2.2 lbs./cu. ft.
Abrasion loss—5.5 percent
Humidity aging (21 days)—5 percent

EXAMPLE 4

A novolac polyol having an OH equivalent weight of 163 and containing 10.45 percent by weight of OH was prepared by reacting 55 parts by weight of propylene oxide with 90 parts by weight of a novolac resin having a 3.5 average OH functionality and similar to that prepared in part A of Example 1, in the presence of 1 part by weight of trimethylamine as catalyst, and an amine polyol similar to that prepared in part C of Example 1, were used to make a polyurethane foam, omitting the tris(chloroethyl)phosphate flame retardant additive.

Ingredient: Parts by weight
- Novolac polyol _____ [1] 277
- Amine polyol _____ [2] 29.7
- Polymethylene polyphenylisocyanate _____ 293.3
- Trichlorofluoromethane _____ 120
- Liquid silicone-glycol copolymer _____ 6
- Triethylenediamine _____ 0.9
- Dimethylaminoethanolamine _____ 3.6

[1] OH—80%.
[2] OH—20.%

The polyurethane foam had the properties:

Density—1.88 lbs./cu. ft.
Abrasion loss—1.9 percent
Humidity aging (25 days)—10 percent
Compression yield strength [a]—39.5 lbs./sq. in.
K-factor—0.16

[a] By procedure similar to that described in ASTM D1621-59T.

EXAMPLE 5

(A) A novolac resin having a higher OH functionality of 6.36, i.e. having the general formula given in part A of Example 1 wherein $n$ has a value of 4.36, was prepared by reacting phenol with formaldehyde employing procedure similar to that employed in part A of Example 1. The resin was a brown solid.

(B) A novolac polyol was prepared by adding a charge of 58 parts by weight of the novolac resin prepared in part A of this example, together with 100 parts by weight of methyl ethyl ketone as solvent to a reaction vessel equipped with a stirrer. A charge of 0.5 part by weight of trimethylamine was added as catalyst. The mixture was stirred and heated at 115°–120° C. while adding propylene oxide at pressures up to 75 pounds per square inch gauge pressure. A total of 52 parts by weight of propylene oxide were added. After completing the reaction, volatiles were removed by heating the mass at 130° C. with stirring, under vacuum for a period of 2 hours. The residue or novolac polyol product was a liquid having a viscosity of 263.5 centistokes at 210° F., an OH equivalent weight of 221.5 and contained 7.7 percent by weight OH.

(C) A polyurethane foam was prepared from a mixture of the novolac polyol prepared in part B of this example and an amine polyol similar to that prepared in part C of Example 1, using the recipe:

Ingredient: Parts by weight
- Novolac polyol _____ [1] 322.4
- Amine polyol _____ [2] 25.6
- Polymethylene polyphenylisocyanate _____ 252
- Trichlorofluoromethane _____ 102
- Liquid Silicone-Glycol copolymer _____ 6
- Tetramethyl-1,3-butane diamine _____ 3

[1] OH—80%.
[2] OH—20%.

The polyurethane foam had the properties:

Density—2.55 lbs./cu. ft.
Abrasion loss—4.6 percent
Humidity aging (26 days)—0 percent
Compression Yield Strength—36.5 lbs./sq. in.

EXAMPLE 6

(A) A novolac polyol was prepared by reacting propylene oxide with a novolac resin having an OH functionality of 6.1 in amount corresponding to one molecular proportion of the propylene oxide for each OH group in the resin. To hydrogenate the novolac polyol a charge of about 10 parts by weight of said polyol was mixed with an equal volume of ethyl alcohol as solvent and 10 parts by weight of Raney nickel as catalyst. The mixture was agitated and heated at a temperature of 150° C. while being contacted with hydrogen for a period of 26 hours under 1000 pounds per square inch gauge pressure. The product was recovered by filtering the solution to remove the catalyst, then heating the filtrate to vaporize and remove volatile ingredients under vacuum. The residue or hydrogenated novolac polyol was a solid having an OH equivalent weight of 195.6 and a melting point of 63.5 C.

(B) A charge of 40 parts by weight of the amine polyol prepared in part C of Example 1 was added to a pressure resistant vessel equipped with a stirrer. The mixture was stirred and heated at a temperature of 95° C. while adding 40 parts by weight of propylene oxide thereto over a period of 17 hours and at pressures up to 40 pounds per square inch gauge pressure. Thereafter, the reaction mixture was heated for 2 hours at a temperature of 100° C. under vacuum to remove volatiles. The residue or amine polyol product was a liquid having an OH equivalent weight of 128 and contained 13.28 percent by weight OH.

(C) A polyurethane foam was prepared from the hydrogenated novolac polyol and the amine polyol prepared in parts A and B of this example using the recipe:

Ingredient: Parts by weight
- Hydrogenated novolac polyol _____ [1] 261
- Amine polyol _____ [2] 73
- Polymethylene polyphenylisocyanate _____ 266
- Tris(chloroethyl)phosphate _____ 90
- Trichlorofluoromethane _____ 102
- Liquid silicone-glycol copolymer _____ 6
- Tetramethyl-1,3-butane diamine _____ 3

[1] OH—70%.
[2] OH—30%.

The polyurethane foam had the properties:

Density—2.21 lbs./cu.ft.
Abrasion loss—8.7 percent
Humidity aging (28 days)—1.5 percent
Compression yield strength—28.5 lbs./sq.in.
Moisture vapor transmission—[a] 4.7

[a] By procedure similar to that described in ASTM E-96-53T Procedure B.

EXAMPLE 7

A polyurethane foam was prepared from a mixture of a novolac polyol similar to that prepared in part B of Example 1, and an amine polyol similar to that prepared in part C of Example 1, using the recipe:

Ingredient: Parts by weight
- Novolac polyol _____ [1] 260.4
- Amine polyol _____ [2] 26.5
- Tolylene diisocyanate _____ 213.1
- Tri(chloroethyl)phosphate _____ 75
- Trichlorofluoromethane _____ 85
- Liquid silicon-glycol copolymer _____ 5
- Tetramethyl-1,3-butane diamine _____ 25

[1] OH—80%.
[2] OH—20.%

The polyurethane foam had the properties:
Density—1.19 lbs./cu.ft.
Abrasion loss—4.8 percent
Humidity aging (29 days)—10 percent

EXAMPLE 8

A polyurethane foam was prepared from a novolac polyol similar to that prepared in Example 4 and the amine polyol N,N,N',N-tetra(2-hydroxypropyl)ethylene diamine employing the recipe:

| Ingredient: | Parts by weight |
|---|---|
| Novolac polyol | [1] 274.8 |
| Amine polyol | [2] 30.7 |
| Polymethylene polyphenylisocyanate | 294.5 |
| Trichlorofluoromethane | 102 |
| Tris(chloroethyl)phosphate | 90 |
| Liquid silicone-glycol copolymer | 6 |
| Tetramethyl-1,3-butane diamine | 3 |

[1] OH—80%.
[2] OH—20.%

The polyurethane foam had the properties:

Density—2.05 lbs./cu.ft.
Abrasion loss—7.7 percent
Humidity aging (26 days)—3 percent
Compression yield strength—39.5 lbs./sq. in.
Moisture vapor transmission—2.68 perm-inches.

EXAMPLE 9

A polyurethane foam was prepared from a novolac polyol similar to that prepared in Example 4 and an amine polyol similar to that prepared in part C of Example 1 employing the recipe:

| Ingredient: | Parts by weight |
|---|---|
| Novolac polyol | [1] 277 |
| Amine polyol | [2] 29.7 |
| Polymethylene polyphenylisocyanate | 293.3 |
| Trichlorofluoromethane | 120 |
| Tris(2-chloroethyl)phosphate | 90 |
| Propylene glycol (P4000) | 6 |
| Tetramethyl-1,3-butane diamine | 3 |

[1] OH—80%.
[2] OH—20.%

The polyurethane foam had the properties:

Density—2 lbs./cu.ft.
Abrasion losst—2.8 percent
Humidity aging (28 days)—8.6 percent
Compression yield strength—38.3 lbs./sq.in.

EXAMPLE 10

An important benefit of this invention is the improved moldability which as previously described influences the final properties of the resulting foam. In this regard dimensional stability is of prime importance and was evaluated in the following test.

A polyurethane foam was prepared from a novolac polyol similar to that prepared in part B of Example 1, and an amine polyol similar to that prepared in part B of Example 6, employing the recipe:

| Ingredient: | Parts by weight |
|---|---|
| Novolac polyol | [1] 342.3 |
| Amine polyol | [2] 67.2 |
| Tris(2-chloroethyl)phosphate | 115.9 |
| Trichlorofluoromethane | 185.4 |
| Polymethylene polyphenylisocyanate | 363.0 |
| Liquid silicone-glycol copolymer | 11.6 |
| Tetramethyl-1,3-butane diamine | 5.5 |

[1] OH—80%.
[2] OH—20.%

The ingredients were blended with one another by means of a high speed mixer for about 10 seconds, then were poured into an inverted L-shaped mold, i.e. a mold having a shape Γ, heated at a temperature of 110° F., so that the material upon foaming was required to rise vertically a distance of 24.5 inches, then expand horizontally a distance of 14 inches to completely fill the mold, and form a foam bun 23 inches wide by 1.5 inches thick. The foam was allowed to remain in the mold for a period of one hour without external heating, then was removed and was allowed to stand in air at room temperature for one hour longer. The resultant foam was free of voids. Thereafter, test pieces 7" x 7" square by 1½ inches thick were cut from the center sections of each arm of the L shaped foam and were placed in a cold box maintained at —20° F. After one hour in the cold box the test pieces were removed and the change in volume of the test pieces was recorded. The test piece from the top section showed a volume change of —2.1%. The test piece from the side section showed a volume change of —1.0%. These low values indicate good moldability. The foam as prepared, had a density of 2.4 pounds per cubic foot.

EXAMPLE 11

To further illustrate the improved properties which are obtainable by practicing this invention, a large scale continuous run was made to make a urethane foam by reaction of polymethylene polyphenylisocyanate with a novolac polyol consisting of the adduct of propylene oxide with a novolac resin similar to that prepared in part B of Example 1 and an amine polyol similar to that prepared in part C of Example 1 employing the recipe:

| Ingredient: | Parts by weight |
|---|---|
| Novolac | [1] 131.7 |
| Amine polyol | [2] 14.0 |
| Polymethylene polyphenylisocyanate | 133.2 |
| Tris(2-chloroethyl)phosphate | 20.9 |
| Polypropylene glycol (P4000) | 1.39 |
| Dibutyl tin dilaurate | 0.07 |
| Trichlorofluoromethane | 50.2 |

[1] OH—80%.
[2] OH—20.%

The ingredients were blended together in a mixing head and were discharged therefrom through a nozzle onto a moving belt in an open paper lined trough having the dimensions of 48 to 98 inches by 18 inches deep. The material was allowed to foam at ambient temperature. A foam bun about 16 inches deep was obtained in a period of about 2 minutes. The bun was allowed to cure by standing at room temperature for a period of 24 hours. Thereafter, the bun was trimmed free of surface skin. Test pieces were cut from the foam bun. These test pieces were used to determine the properties of the foam. The foam had the properties:

Density—1.82 lbs./cu. ft.
Abrasion loss—2.9 percent
Humidity aging (28 days)—1.5 percent
Compression yield strength—35.7 lbs./sq. in.
Moisture vapor transmission—0.99 perm-inch
K factor—0.12

The low moisture vapor transmission and K factor, the excellent humidity aging and other properties are particularly to be noted, since the overall balance of excellent properties is totally unpredictable and of great benefit in the use of said foams.

EXAMPLE 12

To illustrate that the improved properties and benefits of this invention are unexpected a series of runs were made to compare foams made from the polyol mixtures of this invention to those made by substituting a conventional polyether polyol for the amine polyol in said mixture.

(A) N novolac polyol was prepared by reaction of propylene oxide with a phenol-formaldehyde novolac resin having an average of 3.4 phenolic rings per molecule. The novolac polyol was a viscous liquid having a viscosity of 578 centistokes at 210° F., an OH equivalent weight of 172 and contained 9.9 percent by weight OH by analysis.

(B) An amine polyol was prepared by reaction of propylene oxide with aminoethylethanolamine of the formula $H_2NCH_2 \cdot CH_2NH \cdot CH_2 \cdot CH_2OH$. The amine polyol was a liquid having a viscosity of 38 centistokes at 210° F., an OH equivalent weight of 70.2 and contained 24.2 percent by weight OH by analysis.

(C) A polyether polyol was prepared by reaction of propylene oxide with glycerol. The polyol was tris(hydroxypropyl)glycerine, a liquid product having a viscosity of 12.4 centistokes at 210° F., an OH equivalent weight of 88.6 and contained 20 percent by weight OH by analysis.

In the preparation of the foams, the materials, except for the tolylene diisocyanate, were blended together, after which the diisocyanate was added. The resulting mixture was blended rapidly on a high speed laboratory mixer for about 10 seconds, then was poured into a cardboard box and allowed to foam. The foam was cured for one hour at 140° F. The recipes employed in making the foams are shown below:

| Ingredient | Parts by weight | |
|---|---|---|
| | Foam A | Foam B |
| Novolac polyol | 175.1 (OH%–40%) | 184.8 (OH%–43%) |
| Amino polyol | 116.7 (OH%–60%) | |
| Polyether polyol | | 123.2 (OH%–57%) |
| Tolylene diisocyanate | 308.2 | 292.0 |
| Silicone surfactant | 6.0 | 6.0 |
| Tetramethylbutanediamine | 0.6 | 3.0 |
| Trichlorofluoromethane | 96.0 | 96.0 |

The foam products had the following properties:

| Property | Foam A | Foam B |
|---|---|---|
| Density, lbs./cu. ft. | 1.86 | 1.86 |
| Heat distortion, °C | 120–125 | 100–105 |
| Moisture vapor transmission | 1.16 | 1.68 |
| Compression yield | 30.8/4.8 | 33.8/6.6 |
| K factor | 0.103 | 0.112 |
| Humidity aging (28 days) | 4.5 | 12.1 |
| Abrasion loss | 11.8 | 13.3 |

There are significant improvements in Foam A (the foam of this invention) over the comparison of Foam B in heat distortion, moisture vapor transmission, K factor and humidity aging. Any one of the property improvements is unexpected, but to be able to improve several of these properties in one foam to a significant extent over the comparison foam is not only unexpected but wholly unpredictable.

EXAMPLE 13

Two additional polyurethane foams were made employing the polyols of Example 12. The reactant materials were mixed in a laboratory mixer, then poured into a cardboard box and allowed to foam. The recipes for the foams are shown below:

| Ingredient | Parts by weight | |
|---|---|---|
| | Foam C | Foam D |
| Novolac polyol | 274.4 (OH%–80%) | 271.8(OH%–80%) |
| Amino polyol | 29.8(OH%–20%) | |
| Polyether polyol | | 35.0(OH%–20%) |
| Polymethylene polyphenylisocyanate | 295.8 | 293.2 |
| Trichlorofluoromethane | 96.0 | 108.0 |
| Tris(chloroethyl)phosphate | 45.0 | 45.0 |
| Silicone surfactant | 3.0 | 3.0 |
| Tetramethyl-1,3-butanediamine | 3.0 | 4.5 |

The properties of Foams C and D are tabulated below:

| Property | Foam C | Foam D |
|---|---|---|
| Density, lbs./cu.ft. | 2.05 | 1.86 |
| Heat distortion, °C | 125–130 | 125–130 |
| Mositure vapor transmission | 1.45 | 1.46 |
| Compression yield | 42.0 | 38.1 |
| K factor | 0.112 | 0.105 |
| Humidity aging (28 days) | 4.7 | 4.7 |
| Abrasion loss percent | 2.0 | 2.4 |

More significant data are obtained in comparative tests of this type when an average of a larger number of samples is obtained. Accordingly the above formulations were each repeated five separate times and the physical properties determined and tabulated below:

| | Foam C (amine polyol) | | | | |
|---|---|---|---|---|---|
| | Density | Heat distortion, °C | MVT | Compressive yield | Humidity aging (14 days), percent |
| Test Number: | | | | | |
| C-1 | 1.95 | 120–125 | 2.45 | 36.2 | 8.2 |
| C-2 | 2.20 | 110–115 | 2.03 | 43.9 | 5.0 |
| C-3 | 2.16 | 110–115 | 2.10 | 41.3 | 6.6 |
| C-4 | 2.20 | 110–115 | 2.03 | 46.8 | 5.0 |
| C-5 | 1.92 | 120–125 | 2.06 | 37.1 | 8.3 |
| Average | 2.09 | 115–120 | 2.13 | 41.1 | 6.6 |
| | Foam D (polyether polyol) | | | | |
| D-1 | 2.29 | 110–115 | 2.11 | 40.9 | 8.3 |
| D-2 | 2.29 | 110–115 | 2.24 | 39.5 | 8.3 |
| D-3 | 2.39 | 110–115 | 2.07 | 44.4 | 8.3 |
| D-4 | 2.26 | 110–115 | 2.32 | 40.7 | 8.3 |
| D-5 | 2.23 | 110–115 | 2.28 | 43.3 | 8.3 |
| Average | 2.29 | 110–115 | 2.20 | 41.8 | 8.3 |

Desirably the amine polyol foams have a lower density yet they have compressive yield strengths almost equal to the higher density polyether polyol foam. Additionally and importantly, the foams of this invention have improved humidity aging properties over the comparison foam.

The proportions of said novolac polyol and said amine polyol have been defined herein on the basis of the percent of OH in the polyol mixture. Since it may be useful to the skilled worker the proportions have been converted to a weight basis where, accordingly, 40 to 80 percent of said novolac polyol on an OH basis is equivalent to 24 to 99 percent on a weight basis and where 60 to 20 percent of said amine polyol on an OH basis is equivalent to 76 to 1 percent on a weight basis.

What is claimed is:

1. A rigid foamed polyurethane that is the reaction product, carried out in the presence of a foaming agent, of an organic polyisocyanate and a mixture of polyols comprising (1) a novolac polyol having the general formula

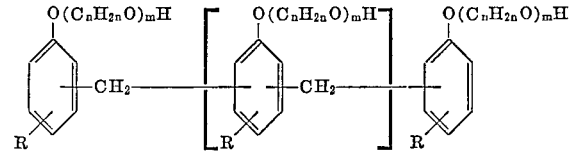

wherein R is hydrogen or a methyl group, $n$ is a whole number from 2 to 4, $m$ is an integer from 1 to 15 and $x$ is a value from 0.5 to 10, and (2) an amine polyol having the general formula

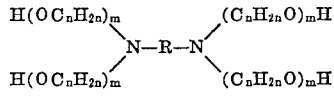

wherein R is an alkylene radical having from 2 to 6 carbon atoms, $n$ is a whole number independently selected from 2 to 4, and $m$ is an integer from 1 to 4, the proportion of said novolac polyol corresponding to about 40 to 80 percent of the OH groups and the proportion of said amine polyol corresponding to about 60 to 20 percent of the total OH groups in the polyol mixture.

2. The rigid polyurethane foam of claim 1 wherein the R group of said novolac polyol is hydrogen, $m$ is an integer from 1 to 10, $n$ is as defined and $x$ has a value from 1 to 4.

3. The rigid polyurethane foam of claim 2 wherein said novolac polyol is a propoxylated phenol-formaldehyde novolac polyol where $n$, accordingly, is 3.

4. The rigid polyurethane foam of claim 3 wherein said amine polyol is a propoxylated amine wherein R is an alkylene radical having 2 carbon atoms, $n$ is 3 and $m$ may be 1 or 2.

5. The rigid polyurethane foam of claim 2 wherein said novolac polyol has a molecular weight corresponding to an average of about 3.5 hydroxyl groups per molecule.

6. The rigid polyurethane foam of claim 1 wherein the aromatic rings of said novolac polyol are hydrogenated.

7. A rigid foamed polyurethane that is the reaction product, carried out in the presence of a foaming agent, of an organic polyisocyanate and mixture of polyols comprising (1) a novolac polyol having the general formula,

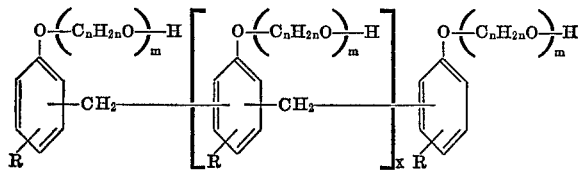

wherein R is hydrogen or a methyl group, $n$ is a whole number from 2 to 4, $m$ is an integer from 1 to 15 and $x$ has a value from 0.5 to 10, and (2) an amine polyol having the general formula,

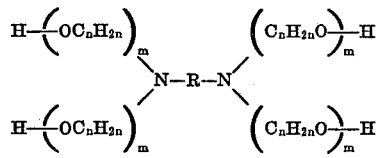

wherein R is an alkylene radical having from 2 to 6 carbon atoms, $n$ is a whole number independently selected from 2 to 4, and $m$ is an integer from 1 to 4, the proportion of said novolac polyol corresponding to about 60 to 80 percent of the OH groups and the proportion of said amine polyol corresponding to about 40 to 20 percent of the total OH groups in the polyol mixture.

8. The rigid polyurethane foam of claim 7 wherein the R group of said novolac polyol is hydrogen, $m$ is an integer from 1 to 10, $n$ is as defined and $x$ has a value from 1 to 4.

9. The rigid polyurethane foam of claim 8 wherein said novolac is a propoxylated phenol-formaldehyde novolac polyol where $n$, accordingly is 3.

10. The rigid polyurethane foam of claim 9 wherein said amine polyol is a propoxylated amine wherein R is an alkylene radical having 2 carbon atoms, $n$ is 3 and $m$ may be 1 or 2.

11. The rigid polyurethane foam of claim 8 wherein said novolac polyol has a molecular weight corresponding to an average of about 3.5 hydroxyl groups per molecule.

12. The rigid polyurethane foam of claim 7 wherein the aromatic rings of said novolac polyol are hydrogenated.

References Cited
UNITED STATES PATENTS 3,470,118   9/1969   Forster _____ 260—2.5

HOWARD E. SCHAIN, Primary Examiner

U.S. Cl. X.R.

260—2.5 AP, 51.5, 59